United States Patent
Lumsden et al.

(10) Patent No.: US 10,723,934 B2
(45) Date of Patent: Jul. 28, 2020

(54) SURFACTANTS FOR USE IN LIQUID SUSPENSIONS OF LIGHTWEIGHT BEADS

(71) Applicant: HALLIBURTON ENERGY SERVICES, INC., Houston, TX (US)

(72) Inventors: Simone E.A. Lumsden, Pearland, TX (US); Sam J. Lewis, Spring, TX (US); Greg R. Hundt, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 131 days.

(21) Appl. No.: 16/060,975

(22) PCT Filed: Feb. 9, 2016

(86) PCT No.: PCT/US2016/017096
§ 371 (c)(1),
(2) Date: Jun. 11, 2018

(87) PCT Pub. No.: WO2017/138919
PCT Pub. Date: Aug. 17, 2017

(65) Prior Publication Data
US 2018/0355236 A1    Dec. 13, 2018

(51) Int. Cl.
| | | |
|---|---|---|
| *C09K 8/473* | (2006.01) | |
| *C09K 8/467* | (2006.01) | |
| *C09K 8/03* | (2006.01) | |
| *C04B 28/02* | (2006.01) | |
| *C09K 8/42* | (2006.01) | |
| *C09K 8/584* | (2006.01) | |

(52) U.S. Cl.
CPC ............. *C09K 8/473* (2013.01); *C04B 28/02* (2013.01); *C09K 8/03* (2013.01); *C09K 8/424* (2013.01); *C09K 8/467* (2013.01); *C09K 8/584* (2013.01); *C09K 2208/06* (2013.01); *C09K 2208/28* (2013.01); *Y02W 30/92* (2015.05)

(58) Field of Classification Search
CPC .......... C09K 8/473; C09K 8/467; C09K 8/03; C09K 8/424; C09K 8/584; C09K 2208/06; C09K 2208/228; C04B 28/02; Y02W 30/92
See application file for complete search history.

(56) References Cited

U.S. PATENT DOCUMENTS

| | | | |
|---|---|---|---|
| 6,601,647 B2 | 8/2003 | Brothers et al. | |
| 6,626,991 B1 * | 9/2003 | Drochon | C04B 28/02 106/672 |
| 2003/0101914 A1 | 6/2003 | Brothers et al. | |
| 2005/0011412 A1 | 1/2005 | Vijn et al. | |
| 2005/0241538 A1 | 11/2005 | Vargo, Jr. et al. | |
| 2005/0241545 A1 | 11/2005 | Vargo, Jr. et al. | |
| 2013/0206408 A1 | 8/2013 | Chatterjee et al. | |
| 2016/0115366 A1 * | 4/2016 | Maxson | E21B 33/13 166/292 |
| 2018/0079948 A1 | 3/2018 | Mendenall et al. | |

FOREIGN PATENT DOCUMENTS

| | | |
|---|---|---|
| CA | 2856942 | 1/2016 |
| WO | WO 2015047268 A1 | 4/2015 |

OTHER PUBLICATIONS

International Search Report and Written Opinion for International Application No. PCT/US2016/017096 dated Oct. 12, 2016. (12 pages).
Canadian Intellectual Property Office, Canadian Office Action, dated May 23, 2019, 4 pages.

* cited by examiner

*Primary Examiner* — Sanza L. McClendon
(74) *Attorney, Agent, or Firm* — Haynes and Boone, LLP (57) ABSTRACT

A method for suspending lightweight beads in a fluid includes combining lightweight beads, a fluid, and a surfactant to form a liquid additive. The liquid additive may be used to reduce the density of a wellbore fluid. The liquid additive or wellbore fluid can be combined with a cementitious material to form a lightweight cement composition.

20 Claims, 4 Drawing Sheets

SURFACTANTS FOR USE IN LIQUID SUSPENSIONS OF LIGHTWEIGHT BEADS

CROSS-REFERENCE TO RELATED APPLICATIONS

This application is a U.S. national stage application of International Application No. PCT/US2016/017096, filed Feb. 9, 2016, the benefit of which is claimed and the disclosure of which is incorporated herein by reference in its entirety.

TECHNICAL FIELD

The present invention relates generally to liquid additives for lightweight cement compositions and wellbore fluids and more specifically to liquid additives that incorporate the use of surfactants in liquid suspensions of lightweight beads.

BACKGROUND

Well cementing is a process used in penetrating subterranean formations to recover resources such as gas, oil, and minerals. Well cementing generally involves drilling a wellbore, placing a string of pipe within the wellbore, and pumping a cement slurry into the annulus, or space between the pipe and the walls of the wellbore. After the cement is allowed to set, the annulus is sealed preventing the well fluids from escaping into the formation. Although several suitable cement compositions can be used, low density or lightweight cement compositions are commonly used in wells that extend through weak formations because they can reduce the hydrostatic pressure exerted by the column. This reduction can reduce and/or eliminate formation fractures, drilling and servicing fluid loss, and damage to the formation.

A variety of lightweight cement compositions using lightweight additives and/or beads have been used in cementing. In the "dry blend" method, lightweight beads are combined with a dry bulk mixture of cement and then mixed with water to form a cement slurry. When the beads are distributed uniformly within the cement composition prior to the addition of water, the method creates an ideal lightweight cement composition. However, the dry blend method has two related problems when used in large-scale manufacturing. First, the beads often become packed during storage leading to large masses of beads or "agglomerations." Second, the beads often segregate from the dry cement during loading, unloading, and transporting. Both problems lead to a non-uniform distribution of beads within the dry cement composition. If untreated, non-uniformities in the bead distribution can prevent a uniform cement composition. Therefore, special procedures are often employed to reduce the segregation or packing of beads before water is added to the cement composition or before the slurry is added to the wellbore. These procedures add to the complexity and increase the overall cost of the cementing process.

Several liquid methods have been proposed to address the known problems of the dry blend method with varying success. One liquid method involves suspending beads in a fluid containing water gelled with sodium bentonite or other water absorbing material. As long as the liquid-bead suspension remains flowable, this "liquid suspension" method creates an ideal liquid additive for lightweight cement compositions. However, bead packing remains an issue and once again, special procedures must be employed to re-suspend the beads that have been separated from the fluid.

SUMMARY OF THE DISCLOSURE

According to several exemplary embodiments, a liquid additive containing a surfactant and lightweight beads suspended in a fluid is combined with a cementitious material to form a lightweight cement composition. According to several exemplary embodiments, a liquid additive containing a surfactant and lightweight beads suspended in a fluid is combined with an aqueous fluid to form a wellbore fluid. According to several exemplary embodiments, a method for suspending lightweight beads includes combining the lightweight beads, a fluid, and a surfactant.

Technical advantages of several exemplary embodiments may include a liquid additive that includes a suspension of beads that remain in solution for longer periods, are less likely to "pack off" or separate from the liquid, and are easier to redisperse after separation. Technical advantages of several exemplary embodiments may include a liquid additive with a longer shelf life or a liquid additive that requires less energy and/or less manual intervention to rehabilitate after the shelf life has expired. Other technical advantages will be readily apparent to one of ordinary skill in the art from the following descriptions, methods, and claims. Moreover, while specific advantages have been enumerated above, various embodiments may include all, some, or none of the enumerated advantages.

BRIEF DESCRIPTION OF THE DRAWINGS

For a more complete understanding of the present disclosure, reference is now made to the following description, taken in conjunction with the accompanying drawings, in which.

DETAILED DESCRIPTION OF THE DISCLOSURE

According to several exemplary embodiments, the overall manufacturing costs of the liquid suspension method described above can be reduced by increasing the time the beads remain in solution and/or by decreasing the energy required to re-suspend the beads after they become separated from the solution. According to several exemplary embodiments, methods and compositions that include surfactants are described for use in liquid suspensions of lightweight beads for providing these and other desired features. While the following descriptions of FIGS. 1, 2A, and 2B generally refer to a cement composition, those of ordinary skill in the art will readily recognize that the principles described herein are equally applicable to a liquid additive, a volume of lightweight beads, or a wellbore fluid containing lightweight beads, without departing from the scope of the disclosure.

Figure 1:
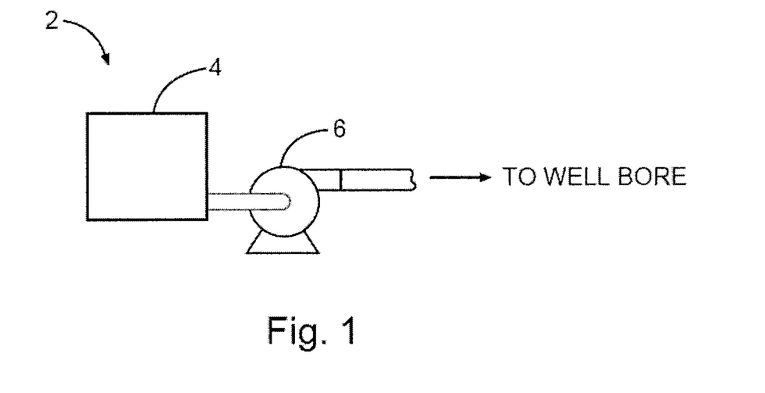
FIG. 1 illustrates a system for preparation and delivery of a cement composition, a liquid additive, a volume of lightweight beads, or a wellbore fluid containing lightweight beads to a wellbore according to several exemplary embodiments.

FIG. 1 illustrates a system 2 for preparation and delivery of a cement composition, a liquid additive, a volume of lightweight beads, or a wellbore fluid to a wellbore according to several exemplary embodiments. As shown in FIG. 1, the cement composition may be mixed in mixing equipment 4, such as a jet mixer, a re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
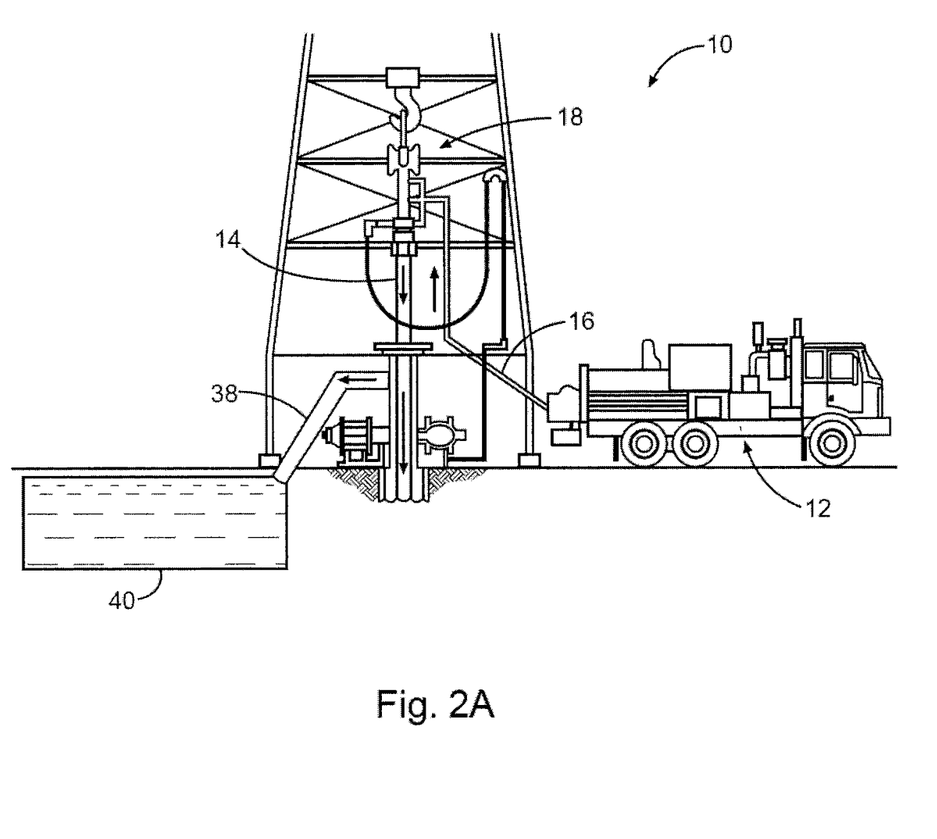
FIG. 2A illustrates surface equipment that may be used in placement of a cement composition in a wellbore according to several exemplary embodiments.

A technique and system for placing a cement composition into a subterranean formation is described with reference to FIGS. 2A and 2B. FIG. 2A illustrates surface equipment 10 that may be used to place a cement composition according to several exemplary embodiments. While FIG. 2A generally depicts a land-based operation, those of ordinary skill in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing and pumping equipment (e.g., mixing equipment 4 and pumping equipment 6 of FIG. 1) as will be apparent to those of ordinary skill in the art. The cementing unit 12 may pump a cement composition 14 through a feed pipe 16 and to a cementing head 18, which conveys the cement composition 14 downhole.

Figure 2B:
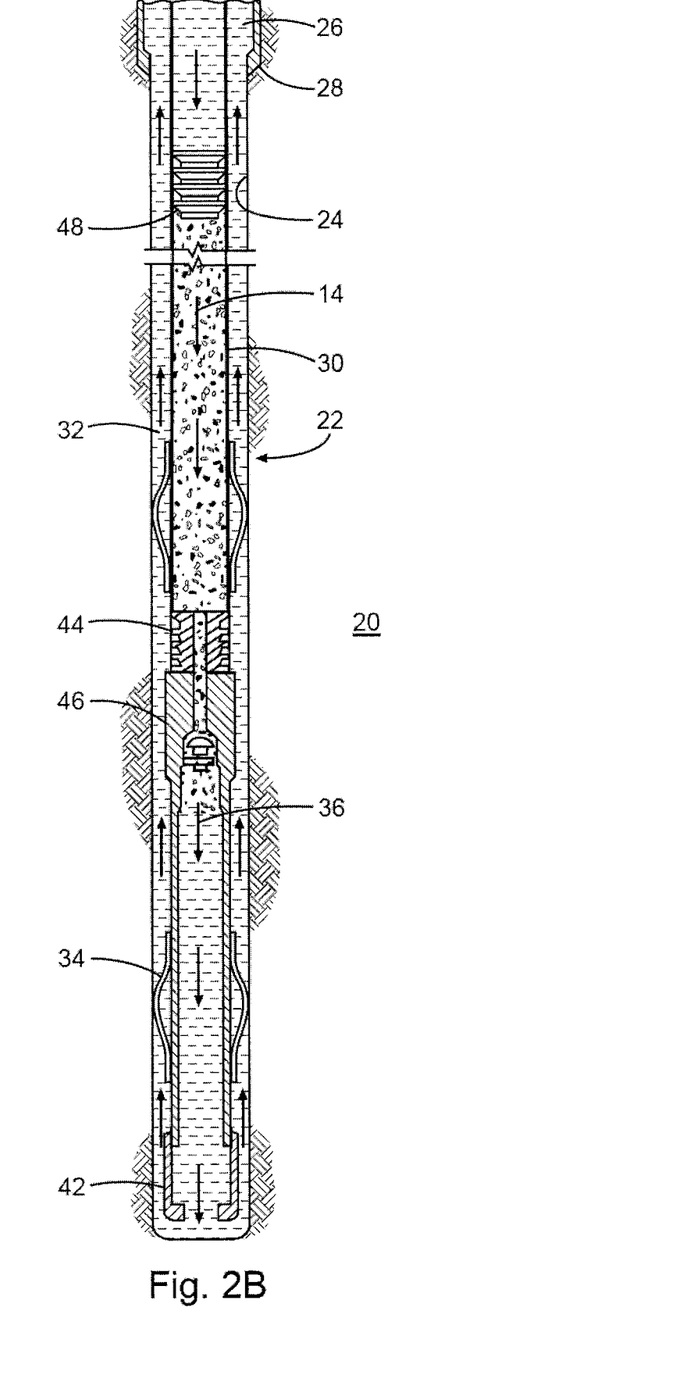
FIG. 2B illustrates placement of a cement composition into a wellbore annulus according to several exemplary embodiments.

FIG. 2B illustrates a wellbore 22 drilled into a subterranean formation 20. Cement composition 14 may be pumped into wellbore 22. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. According to several exemplary embodiments, a surface casing 26 has been inserted into the wellbore 22. The surface casing 26 may be cemented to the walls 24 of the wellbore 22 by cement sheath 28. According to several exemplary embodiments, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. According to several exemplary embodiments, a top plug 48 may be introduced into the wellbore 22 behind the cement composition 14. The top plug 48 may separate the cement composition 14 from a displacement fluid and push the cement composition 14 through the bottom plug 44.

Figure 3:
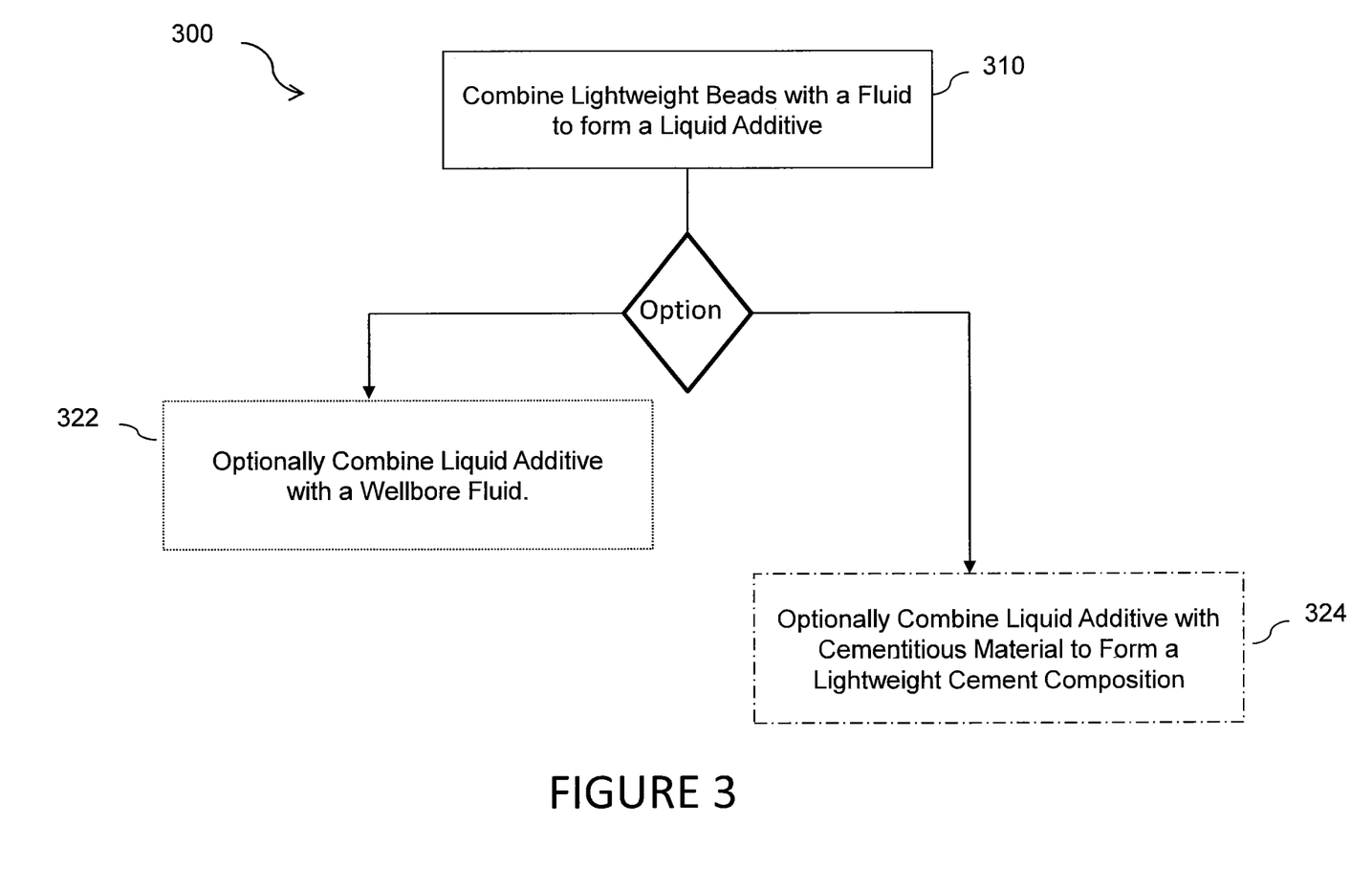
FIG. 3 illustrates a method for suspending lightweight beads, according to several exemplary embodiments.

FIG. 3 illustrates an example method 300 for suspending lightweight beads, according to several exemplary embodiments. Method 300 begins with step 310 where the lightweight beads are combined with a fluid to form a liquid additive. Lightweight beads may be added in any amount to a wellbore fluid, lightweight cement composition, or liquid additive to achieve desired properties of thereof. Accordingly, a "volume of lightweight beads" refers to a plurality or group of lightweight beads and not necessarily a specific measurable volume. Moreover, lightweight beads may be added by adding the beads directly or by adding an amount of liquid additive that contains the desired amount of lightweight beads. As used herein, the term "lightweight bead" refers to a particle that may be combined with a cement composition to decrease the density of the cement composition, a particle that may be combined with a wellbore fluid to decrease the density of the wellbore fluid, or a particle with a specific gravity that is about equal to or less than the specific gravity of a fluid or liquid to which it is added. According to several exemplary embodiments, lightweight beads are added to a cement composition to create a lightweight cement composition. According to several exemplary embodiments, lightweight beads are added to a wellbore fluid. According to several exemplary embodiments, lightweight beads have a specific gravity that is less than that of a fluid to which the lightweight beads are added and thus float in the fluid.

A lightweight bead may be spherical, cylindrical, or any suitable shape and/or size. According to several exemplary embodiments, the lightweight bead may be solid or hollow, and if hollow may be filled with gas. According to several exemplary embodiments, a lightweight bead may be any object made from alumina silicate material or any amorphous silica sphere. Illustrative examples of lightweight beads include but are not limited to cenospheres, fly ash microspheres, ceramic spheres, inorganic microspheres, glass spheres, ceramic spheres, and combinations thereof. According to several exemplary embodiments, a lightweight bead is a lightweight, inert, hollow sphere made largely of silica and alumina and filled with air or inert gas. According to several exemplary embodiments, lightweight beads are fly ash microspheres such as the SPHERELITE series of beads, which are commercially available from Halliburton Energy Services, Inc. According to several exemplary embodiments, the lightweight beads are borosilicate glass beads such as the SCOTCHLITE HGS series of beads or Glass Bubbles HGS series of beads both of which are commercially available from by the 3M Company. For example, the lightweight beads may include HGS 4,000 beads, HGS 6,000 beads, HGS 10,000 beads, and HGS 18,000 beads, or combinations thereof.

According to several exemplary embodiments, a fluid is an aqueous fluid selected from the group consisting of fresh water, brackish water, saltwater, brine, aqueous drilling fluids, and any combination thereof. According to several exemplary embodiments, a fluid includes a working fluid, such as fluid 36, described in reference to FIGS. 2A and B above. According to several exemplary embodiments, a fluid includes a liquid used to form a cement composition and/or slurry. According to several exemplary embodiments, a fluid includes a wellbore fluid, which is described in more detail in reference to optional step 322 below. According to several exemplary embodiments a fluid contains, a surfactant, an antifoaming agent, and water absorbing material.

A suspension of solid particles in a fluid or liquid typically refers to a mixture of particles distributed uniformly or non-uniformly throughout the fluid. However, all suspensions are temporary and if left undisturbed for a period of time, eventually will separate into a portion that is liquid and a portion that is substantially particles. The "shelf life" of a suspension is often used to quantify the amount of time before the fluid and the particles separate. The particles are "re-suspended" by applying an internal or external action or force that causes some or all of the separated particles to become suspended or re-suspended. Often re-suspension requires manual intervention, which is especially undesirable in large-scale manufacturing processes.

According to several exemplary embodiments, lightweight beads are suspended in a fluid when the lightweight beads are initially uniformly or non-uniformly distributed throughout the fluid but will separate into a portion that is substantially liquid and a portion that is substantially lightweight beads, if left undisturbed for a sufficient period of time. According to several exemplary embodiments, a portion of lightweight beads is suspended in a fluid if some, but not all, lightweight beads are initially uniformly or non-uniformly distributed throughout the fluid but will separate into a portion that is substantially liquid and a portion that is substantially lightweight beads if left undisturbed for a sufficient period of time. The lightweight beads are considered suspended, even if the period before the separation into substantially liquid and substantially bead portions is unknown. The term "substantially" is used to mean that the liquid portion may include a minority of beads and the bead portion may include at least some liquid. The beads that have separated into a portion that is substantially lightweight beads are said to have floated or fallen "out of solution." Additionally as more beads float or fall out of solution the separated beads may arrange (or "pack") such that the void (or amount of space between beads) is reduced. Rearranging of beads to reduce the void space is often referred to as "packing" and the beads that are in this type of arrangement are said to have "packed off".

According to several exemplary embodiments, a liquid additive is a fluid and/or solution that contains lightweight beads. According to several exemplary embodiments, a liquid additive includes a combination of a fluid and lightweight beads. According to several exemplary embodiments, a liquid additive includes a combination of the fluid and lightweight beads with at least a portion of the lightweight beads suspended in the fluid. According to several exemplary embodiments, a liquid additive includes a combination of the fluid and the lightweight beads with a majority of the lightweight beads suspended in the fluid. According to several exemplary embodiments, the amount of lightweight beads suspended in the fluid is from about 5% to about 70% of the lightweight beads, from about 20% to about 60% of the lightweight beads, or from about 37% to about 47% of the lightweight beads.

According to several exemplary embodiments, method 300 terminates after step 320. However according to several exemplary embodiments, and as shown in FIG. 3, the liquid additive formed in step 320 is combined with a wellbore fluid as shown in step 322 or is combined with a cementitious material to form a lightweight cement composition as shown in step 324.

In step 322, the liquid additive of step 320 may be combined with a wellbore fluid. The wellbore fluid of step 322 may be of the same composition as the fluid in step 320, or a different composition. Generally however, any fluid suitable for use in step 320, may also be used in step 322. Similarly, any fluid suitable for use in step 322, may also be used in step 320. As used herein, a "wellbore fluid" refers to a fluid for use in a wellbore and may be used to drill, complete, work over, fracture, repair, or in any way prepare a wellbore for the recovery of materials from the wellbore. According to several exemplary embodiments, the wellbore fluid may be used to seal or condition the annulus or casing; to prevent the loss of aqueous or non-aqueous drilling fluids into lost circulation zones such as voids, vugular zones, fractures; or to create a barrier to the flow (and undesirable loss) of fluids to the surrounding formation. According to several exemplary embodiments, the wellbore fluid may be used to displace drilling fluid from the annulus, to separate drilling fluids from a cement slurry, to transport drilled cuttings to the surface, to cool and lubricate the drillstring, or to minimize formation damage. Examples of wellbore fluids include, but are not limited to, cement slurries, drilling fluids or muds, spacer fluids, lost circulation fluids, fracturing fluids, displacing fluids or completion fluids. According to several exemplary embodiments, the wellbore fluid is an aqueous or oil-based working fluid. According to several exemplary embodiments, a wellbore fluid contains an aqueous fluid and a liquid additive.

The liquid additive is added in any amount to a wellbore fluid in step 322. According to several exemplary embodiments, the wellbore fluid of optional step 322 may be used to transport the liquid additive into a wellbore. According to several exemplary embodiments, the liquid additive is added to a wellbore fluid in an amount sufficient to reduce the density or equivalent circulating density (ECD) of the wellbore fluid without affecting the fluid's functionality. According to several exemplary embodiments, the amount of liquid additive added to a wellbore fluid may be selected to prevent induced fractures, lost circulation, fluid loss, wellbore instability, or potential safety issues. According to several exemplary embodiments, the amount of liquid additive added to the wellbore fluid may reduce the density of the wellbore fluid to about 50% to about 99% of the density of the wellbore fluid without the lightweight beads. According to several exemplary embodiments, the amount of liquid additive added to the wellbore fluid may be added to reduce the density of the wellbore fluid to about 40% to about 90% of the density of the wellbore fluid without the lightweight beads.

According to several exemplary embodiments, a liquid additive is added to a wellbore fluid to reduce the density of the wellbore fluid relative to a second wellbore fluid that has been or will be added to the wellbore. According to several exemplary embodiments, a liquid additive is added to one or more wellbore fluids that have been or will be added to the same wellbore to create a desired density hierarchy. As used herein the "density hierarchy" of a group of fluids refers to the order of their relative densities. According to several exemplary embodiments, the amount of liquid additive added to a wellbore fluid may be selected to achieve a desired density hierarchy for the displacement of the wellbore fluids present or expected to be present in the wellbore. For example, during a multi-fluid displacement operation such as the cementing of a wellbore, there may be several wellbore fluids present in the wellbore. In this example, there may be a drilling mud in the wellbore, a spacer fluid added to displace the drilling mud, and a cementing fluid added to repair a fracture in the pipe casing. Ideally, the density of the drilling mud would be less than the density of the spacer fluid and the density of the spacer fluid would be less than the density of the cementing fluid. However, if this desired density hierarchy was not inherit to the chosen fluids, the desired density hierarchy can be achieved by adding materials to increase or decrease the density of one or more of the fluids. According to several exemplary embodiments, lightweight beads may be added to any wellbore fluid (e.g., the drilling mud, the spacer fluid, or the cementing fluid) to achieve a better displacement efficiency. According to several exemplary embodiments, lightweight beads may be added to a first wellbore fluid to reduce its density relative to a second wellbore fluid. According to several exemplary embodiments, lightweight beads may be added to the first wellbore fluid to reduce its density to between 10% and 99% of the density of the second wellbore fluid. According to several exemplary embodiments, lightweight beads may be added to the first wellbore fluid to reduce its density to between 10% and 30% of the density of the second wellbore fluid.

According to step 324 of FIG. 3, the liquid additive formed in step 320 of method 300 may be combined with a cementitious material to form a lightweight cement composition.

According to several exemplary embodiments, a cement composition includes any material, combination of materials, composition, and/or slurry that may be pumped down a conduit, e.g., a casing or a drill pipe (e.g., casing 30 of FIGS. 2A and 2B), run in the wellbore, and up into the annulus where it is allowed to set, thereby forming a substantially impermeable cement column that isolates the wellbore. According to several exemplary embodiments, a cement composition includes a cementitious material combined with a liquid additive. As used herein, the term "lightweight cement composition" refers to any cement composition, where the density of the composition has been decreased due to the addition of solids, liquids, or gases. Common examples of lightweight cement compositions include water extended compositions, foamed cement compositions, and cement compositions with added particles, beads, or microspheres. According to several exemplary embodiments, the density of a lightweight cement composition is between about 4 pounds per gallon to about 16 pounds per gallon. According to several exemplary embodiments, a lightweight cement composition includes a cementitious material combined with a liquid additive containing lightweight beads. According to several exemplary embodiments, a lightweight cement composition includes a cementitious material combined with wellbore fluid containing lightweight beads.

According to several exemplary embodiments, the cementitious materials include hydraulic cement, which sets and hardens by reaction with water and is typically composed of calcium, aluminum, silicon, oxygen, sulfur, or combinations thereof. Non-limiting examples of hydraulic cements include Portland cements, pozzolan cements, gypsum cements, high alumina content cements, silica cements, and high alkalinity cements. According to several exemplary embodiments, the cementitious material is a Portland cement such as a class A, C, G, or H Portland cement, or a TXI lightweight oil/well cement commercially available from Texas Industries Inc. of Dallas, Tex. According to several exemplary embodiments, the cementitious material includes shale cements, acid/base cements, fly ash cements, zeolite cement systems, kiln dust cement systems, microtine cements, metakaolin, resins, and combinations thereof. According to several exemplary embodiments, the cementitious material may include a resin or a hybrid additive. According to several exemplary embodiments, the cementitious material may be a composite or hybrid of an epoxy or a resin and another cementitious material. For example, the cementitious material may include a cement-resin hybrid or a cement-resin composite. Suitable resins are known to those of ordinary skill in the art and may be used as a cement additive or even as a cement alternative to provide adhesion, chemical resistance, or mechanical properties to the cement blends.

According to several exemplary embodiments, a lightweight cement composition includes a cementitious material, a water absorbing material, and a liquid additive. According to several exemplary embodiments, the liquid additive or lightweight beads are added in amounts sufficient to reduce the density of the cement composition such that the cement composition is a lightweight cement composition having a density from about 4 pounds per gallon to about 16 pounds per gallon. The liquid additive or lightweight beads may be added to the lightweight cement composition in any amount depending on the desired properties of the cement slurry. According to several exemplary embodiments, the liquid additive is from about 1% to about 50% by volume of total mixed fluid, from about 5% to about 30% by volume of total mixed fluid, or from about 5% to about 20% by volume of total mixed fluid. Similarly, lightweight beads may be added relative to the amount by weight of the cementitious material, the amount by weight of the fluid, the amount by volume of the fluid, or relative to any other material. According to several exemplary embodiments, the lightweight beads may be added in an amount from about 2% to about 100% by weight of cementitious material, from about 4% to about 40% by weight of cementitious material, or from about 5% to about 20% by weight of cementitious material. According to several exemplary embodiments, the lightweight beads may be added in an amount to obtain particular physical properties of the fluid, a cement composition, or relative to the wellbore. According to several exemplary embodiments, the amount of liquid additive added to the cement composition may reduce the density of the cement composition to about 50% to about 99% of the density of the cement composition without the lightweight beads. According to several exemplary embodiments, the amount of liquid additive added to the cement composition may be added to reduce the density of the cement composition to about 40% to about 90% of the density of the cement composition without the lightweight beads.

The fluid of step 310, the liquid additive of step 320, or the wellbore fluid of step 322, or the lightweight cement composition of step 324 may include additional additives as deemed appropriate for improving the properties of the fluid, the liquid additive, the wellbore fluid, or the lightweight cement composition. Such additives may vary depending on the intended use of the fluid, may be introduced singularly or in combination using any suitable methodology, and may be added in any amount effective to produce the desired improvements in the fluid properties. Examples of such additives include, but are not limited to, emulsifiers, lime, organic/inorganic viscosifiers, weighting agents, glass fibers, carbon fibers, suspending agents, conditioning agents, dispersants, water softeners, oxidation and corrosion inhibitors, thinners, acid gas scavengers, surfactants, water absorbing materials, antifoaming agents and combinations thereof. According to several exemplary embodiments, the fluid, the liquid additive, the wellbore fluid, or the lightweight cement composition includes one or more of the following additional additives: a surfactant, a water-absorbing material, and an antifoaming agent.

According to several exemplary embodiments, a surfactant increases the shelf life of a liquid additive and/or wellbore fluid. The shelf life of a liquid additive and/or wellbore fluid refers to the period of time during which the liquid additive and/or wellbore fluid may be stored without an undesirable portion of the lightweight beads forming an agglomeration, falling or floating out of solution, packing off, or separating from the fluid. The shelf life also refers to any period of time after which there is a decrease in the usefulness of the liquid additive and/or wellbore fluid. After the shelf life expires, the lightweight beads may be re-suspended by applying an internal or external action or force that causes some or all of the separated beads to become suspended.

According to several exemplary embodiments, a surfactant decreases the time, energy, and/or equipment needed to re-suspend lightweight beads that have formed an agglomeration, fallen/floated out of solution, packed off, and/or separated from the fluid. According to several exemplary embodiments, suitable surfactants include alcohol ether sulfates, betaines, sulfo-betaines, amine-oxides, polyether carboxylates, quaternary amines, alkanolamides, methyl-ester sulfonates, sorbitan and sorbitol derivatives. According to several exemplary embodiments, suitable alcohol ether sulfates include $C_6$-$C_{10}$ ethoxylated ether sulfates, and $C_6$-$C_{10}$ polyethoxylated alkyl ether sulfates. According to several exemplary embodiments, suitable sulfo-betaines include cocoamidopropylsultaine. According to several exemplary embodiments, suitable betaines include cocamidopropyl-betaine, lauramidopropylbetaine, and laurolylamidopropyl-betaine. According to several exemplary embodiments, suitable amine oxides include cocodimethylamineoxide, hexadecylamine, and amide compounds containing N, N-dimethyl or N-oxide groups. According to several exemplary embodiments, suitable quaternary amines include salts of a polyatomic ion of the structure $NR_4^+$, where R is an alkyl group or an aryl group, octadecyl trimethyl ammonium chloride and dimethyl di(hydrogenated tallow) ammonium chloride. According to several exemplary embodiments, suitable methyl-ester sulfonates include sulfonates with carbon chains having between 6 and 10 carbon atoms. According to several exemplary embodiments, suitable sorbitan derviatives include sorbitan monolaurate and polyoxyethylene sorbitan monolaurate. According to several exemplary embodiments, suitable sorbitol derivatives may sodium laureth sulfate, sodium methyl 2-sulfolaurate, and sodium methyl 2-sulfostearate. The foregoing list of specific surfactants is exemplary and not intended to limit the claims.

According to several exemplary embodiments, a water absorbing material is any material that is able to combine with water in the fluid to increase the viscosity and/or specific gravity of the fluid or liquid additive, such as a viscosifying agent. According to several exemplary embodiments, the water absorbing material changes the fluid such that some, more, or all of the lightweight beads may be suspended in the fluid or liquid additive. According to several exemplary embodiments, the water absorbing material increases the shelf life of the liquid additive by allowing some, more, or all of the lightweight beads to remain suspended for a longer period of time than the beads will remain suspended without the water absorbing material. According to several exemplary embodiments, water absorbing materials include but are not limited to water swellable clays such as sodium bentonite, attapulgite, kaolinite, meta-kaolinite, hectorite, or sepiolite; swellable cross-linked polymers that can absorb and store aqueous liquids by forming a gel, such as sodium acrylate-based polymer; and biopolymers such as xanthan, guar, and diutan gums. The water absorbing material may be added in any amount to achieve the desired properties of the fluid, or the desired amount of lightweight bead suspension and will vary depending on the composition of the fluid and/or the weight and other properties of the lightweight beads. For example, the water absorbing material may be added in an amount of from about 0.1% to about 10% by volume of the lightweight beads, from about 0.1% to about 3% by volume of the lightweight beads, or from about 0.2% to about 2% by volume of the lightweight beads.

According to several exemplary embodiments, an anti-foaming agent is a chemical used to hinder the formation of foam; hinder entrainment of a gas in a liquid; or break a previously formed foam. According to several exemplary embodiments, an anti-foaming agent is a defoamer. According to several exemplary embodiments, an antifoaming agent is a defoaming composition traditionally utilized in the oil and gas industry. Non-limiting examples of antifoaming or defoaming agents include compositions of glycerol tristearate and one or more aliphatic hydrocarbons; propylene glycol; a mixture of propylene glycol with a copolymer of ethylene oxide; propylene oxide monomers; mixtures of polypropylene glycol, particulate hydrophobic silica, and a liquid diluent; an amide of carboxylic acid, a polypropylene glycol, an ethoxylated and propoxylated fatty alcohol, an ethoxylated alcohol comprising from 3 carbons to 6 carbons, and a hydrophobic silica; and an amide of carboxylic acid, a polypropylene glycol, an ethoxylated and propoxylated fatty alcohol, an ethoxylated alcohol comprising from 3 carbons to 6 carbons, and a hydrophobic silica. According to several exemplary embodiments, an antifoaming agent maybe added in an amount of from about 0.001% to about 10% by volume of the liquid additive, from about 0.005% to about 4% by volume of the liquid additive, and from about 0.01% to about 2% by volume of the liquid additive.

According to several exemplary embodiments, the fluid of step 310, the liquid additive of step 320, or the wellbore fluid of step 322 are combined with other additives to form a lightweight cement composition. According to several exemplary embodiments, the liquid additive and cementitious material are combined with additional water and other additives to form a lightweight cement composition. The other additives may be included in the cement compositions as deemed appropriate by those of ordinary skill in the art. Such additives include but are not limited to set retarders, fluid loss control additives, defoamers, dispersants, set accelerators, and formation conditioning agents. According to several exemplary embodiments, the fluid or the liquid additive contains one or more additives that can be included in cement compositions including, but not limited to, set retarders, set accelerators, fluid loss control additives, dispersants, cement friction reducers, strength retrogression control agents, viscosifying agents, formation conditioning agents, water absorbing materials, and anti-foaming agents. According to several exemplary embodiments, the additives are added to the fluid before the fluid is combined with the beads to form the liquid additive. According to other exemplary embodiments, the fluid is combined with the beads to form the liquid additive and then additional additives are combined with the liquid additive either before or while the liquid additive is combined with the cementitious material.

According to several exemplary embodiments, the liquid additive may be mixed with additional water to form a diluted liquid additive, which is subsequently combined with the cementitious material. In these exemplary embodiments, the additional water may comprise fresh water, salt water such as an unsaturated aqueous salt solution or a saturated aqueous salt solution, or combinations thereof. For example, the liquid additive may be injected into a delivery pump being used to supply the additional water to a cement mixing head for mixing the additional water with the cement. As such, the water used to carry the lightweight beads and this additional water are both available to slurry the cement such that the lightweight beads may be dispersed throughout the cement composition. According to several exemplary embodiments, the liquid additive is combined with a previously mixed cement slurry as the slurry is being pumped into the wellbore. In both embodiments, the liquid additive may be injected into the suction port of the pump. In both embodiments, the liquid additive can be added at a controlled rate to the water or the cement slurry using a continuous metering system (CMS) unit known to those of ordinary skill in the art. The CMS unit can also be employed to control the rate at which the additional water is introduced to the cement as well as the rate at which any other additives are introduced to the cement slurry or the water. As such, the CMS unit can be used to achieve an accurate and precise ratio of water to cement and bead concentration in the cement slurry such that the properties of the slurry, e.g., its density, are suitable for the downhole conditions of the wellbore. The concentrations of the components in the cement composition, e.g., the cement and the lightweight beads, can be adjusted to their desired amounts before delivering the composition into the wellbore. Those concentrations thus are not limited to the original design specification of the cement composition and/or liquid additive, and can be varied to account for changes in the downhole conditions of the wellbore that may occur before the composition is actually pumped into the wellbore.

The following examples are illustrative of the compositions and methods discussed above.

EXAMPLES

Two exemplary liquid additives and one control liquid additive were manufactured by weighing and mixing the materials as shown in Table 1 below. The control composition which is hereafter referred to as "Control", included 206.8 grams of HGS-6000, which are soda-lime borosilicate glass beads commercially available from 3M Oil & Gas in Bracknell, Berkshire UK under the trade name "Glass Bubbles HGS", 1.42 grams of soda ash which is commercially available from Fisher Scientific under the chemical name "sodium carbonate anhydrous" and 3.56 grams of sodium bentonite which is commercially available from Halliburton Energy Services, Inc. The first exemplary embodiment, "Example 1", included all the components of the control liquid additive as well as 0.7 grams of D-Air 3000L, a liquid defoamer used to control foaming of cement slurries, and 0.34 grams of SEM-8, an emulsifier surfactant, which are both commercially available from Halliburton Energy Services, Inc. SEM-8 is an example of a short chain $C_6$-$C_{10}$ polyethoxylated alkyl ether sulfate. The second exemplary embodiment "Example 2", included all the components of the control liquid additive, 0.7 grams of D-Air 3000L, and 0.4 grams of Zone Sealant 2000, a surfactant used in foamed cement compositions, which is commercially available from Halliburton Energy Services, Inc. Zone Sealant 2000 is an example of a $C_6$-$C_{10}$ polyethoxylated alkyl ether sulfate.

TABLE 1

| Material | Control | | Example 1- SEM 8 | | Example 2-Zone Sealant 2000 | |
| --- | --- | --- | --- | --- | --- | --- |
| | Mass (g) | Volume (%) | Mass (g) | Volume (%) | Mass (g) | Volume (%) |
| Water | 323.06 | 41.76 | 323.06 | 41.7 | 323.06 | 41.7 |
| HGS-6000 | 206.8 | 58.00 | 206.8 | 57.92 | 206.8 | 57.92 |
| Soda Ash | 1.42 | 0.07 | 1.42 | 0.07 | 1.42 | 0.07 |
| Bentonite | 3.56 | 0.17 | 3.56 | 0.17 | 3.56 | 0.17 |
| D-Air 3000L | Not added | | 0.7 | 0.4 | 0.7 | 0.05 |
| Surfactant | Not added | | 0.34 | 0.1 | 0.4 | 0.1 |

After the liquid additive compositions were manufactured, the example embodiments (i.e. Example 1 and Example 2) were tested and compared to the Control to determine if the example embodiments were suitable for use in wellbore operations and what technical advantages, if any, the addition of the example surfactants may provide to a liquid additive that contains a suspension of lightweight beads. The testing methods and results of Fann Yield Stress Adaptor and Chandler 5550 viscosity testing, roto-tester testing, and visual inspection testing are discussed below.

Fann Yield Stress Adaptor Viscosity Testing

Fann Model 35 viscometers ("Fann viscometer") are direct-reading Couette rotational viscometers used to evaluate the rheological properties of fluids. In a Fann viscometer, a test fluid is contained in an annular space between an outer cylinder ("sleeve") and an inner cylinder ("bob"). Viscosity measurements using a Fann viscometer are made when the sleeve, rotating at a known velocity, causes a viscous drag exerted by the test fluid. This drag creates a torque on the bob, which is transmitted to a precision spring ("spindle"). A Fann Yield Stress Adaptor (FYSA) can be attached to a Fann viscometer to allow the measurement of the deflection of the spindle ("dial measurement") at different rotational speeds.

The FYSA dial measurements and the rotational speed can be used to calculate the viscosity of a test fluid directly according to formula 1 below:

$$\text{viscosity } (\eta) = \frac{\text{shear stress } (\tau)}{\text{shear rate } (\gamma)} = \frac{k_1 k_2 \theta}{k_3 N}$$

where η is the viscosity of the test fluid in centi-Poise (cP); $k_1$ is the torsion constant in dyne-centimeter per degree of deflection; $k_2$ is the shear stress constant for the effective bob surface in cubic centimeters (cm$^3$); $k_3$ is the shear rate constant in inverse seconds (sec$^{-1}$) per rotational speed (in rpm); θ is the Fann viscometer reading or dial measurement;

and N is the rate of revolution of the outer cylinder (in rpm). As used in the above formula 1, $k_1$, $k_2$, and $k_3$ are experimentally calculated constants used to compensate for slight differences in the bob and sleeve of a particular Fann viscometer and can be calculated according to standard industry methods.

FYSA testing of Example 1, Example 2, and the Control was performed three times over an 18-day testing period, and the methods and results are provided below. The initial test was performed on "Day 0", while "Day 7" and "Day 18" testing was performed 7 and 18 days, respectively, after the initial test. Each day the testing was performed in the same order—ramp testing followed by decay testing—as described in more detail below.

FYSA Ramp Testing

Test solutions of Example 1, Example 2, and the Control were made as described in reference to Table 1 above. 200 mL of each solution was poured into a cup and placed under a Fann viscometer fitted with a FYSA attachment. The spindle and sleeve were set to rotate at 3 revolutions per minute (rpm) and the dial measurement was recorded. The speed of the sleeve was then increased from 3 rpm to 6 rpm, from 6 rpm to 100 rpm, from 100 rpm to 200 rpm, and from 200 rpm to 300 rpm and dial measurements were taken at each speed. These readings are shown as "up" in Tables 2a-2c below. After the 300 rpm dial measurement was recorded, the speed of the sleeve was reduced from 300 rpm to 200 rpm, from 200 rpm to 100 rpm, from 100 rpm to 6 rpm, and finally from 6 rpm to 3 rpm. Again, dial measurements were taken at each speed and recorded as "down" in Tables 2a-2c below.

TABLE 2a

FYSA Dial Measurements for Control

| | Ramp | Ramp Testing (Speed in rpm) | | | | |
|---|---|---|---|---|---|---|
| | | 300 | 200 | 100 | 6 | 3 |
| Day 0 | Up | 33 | 23 | 18 | 3 | 2 |
| | Down | | 23 | 13 | 1 | 1 |
| Day 7 | Up | 53 | 41 | 24 | 7 | 6 |
| | Down | | 37 | 20 | 3 | 2 |
| Day 18 | Up | 53 | 40 | 23 | 7 | 6 |
| | Down | | 37 | 20 | 3 | 2 |

TABLE 2b

FYSA Dial Measurements for Example 1-SEM 8

| | Ramp | Ramp Testing (Speed in rpm) | | | | |
|---|---|---|---|---|---|---|
| | | 300 | 200 | 100 | 6 | 3 |
| Day 0 | Up | 33 | 24 | 13 | 2 | 1 |
| | Down | | 23 | 13 | 1 | 0.5 |
| Day 7 | Up | 54 | 42 | 24.5 | 6 | 5 |
| | Down | | 38 | 20 | 2.5 | 1.5 |
| Day 18 | Up | 49 | 36 | 20 | 6 | 5 |
| | Down | | 34 | 18 | 3 | 2 |

TABLE 2c

FYSA Dial measurements for Example 2-Zone Sealant 2000

| | Ramp[1] | Ramp Testing (Speed in rpm) | | | | |
|---|---|---|---|---|---|---|
| | | 300 | 200 | 100 | 6 | 3 |
| Day 0 | Up | 32 | 22 | 18 | 2.5 | 2 |
| | Down | | 20 | 11 | 1 | 0.5 |
| Day 7 | Up | 48 | 38 | 22 | 7 | 6 |
| | Down | | 33 | 18 | 2.5 | 2 |
| Day 18 | Up | 50 | 37 | 22 | 6 | 5 |
| | Down | | 35 | 19 | 3 | 2 |

Using formula 1, where viscosity $$(\text{or } \eta) = \frac{k_1 k_2 \theta}{k_3 N},$$

the RPM settings and the dial measurements for the down ramp for each test fluid, and $k_1$=0.352, $k_2$=0.956 and $k_3$=1; the viscosities for were calculated for each test fluid on each test day. The calculated viscosities are shown in Table 3 below.

TABLE 3

Viscosities Calculated from FYSA Ramp Testing

| Test Fluid | Viscosity (cP) Day 0 | Viscosity (cP) Day 7 | Viscosity (cP) Day 18 |
|---|---|---|---|
| Control | 277 | 402 | 409 |
| Example 1-SEM 8 | 279 | 433 | 402 |
| Example 2-Zone Sealant 2000 | 282 | 376 | 400 |

Viscosities calculated by this method are assumed accurate within 5-10 cP.

The viscosity of the example embodiments were of concern because too much surfactant can increase the viscosity of a fluid and/or liquid additive making it hard or impossible to pump into a wellbore. Generally, anything with a viscosity greater than 1500 cP is considered non-pumpable and therefore not suitable for cementing operations and/or other wellbore processes. Additionally, the fluid's viscosity affects the flow properties of the fluid. Manufacturing equipment is usually designed and/or optimized for a particular range of fluid viscosities, thus changes to a manufacturing process can be less desirable if the viscosity of a fluid varies significantly from the original process. The viscosity of Example 1 remained below 450 cP, while the viscosity of Example 2 remained below 400 cP, which indicates that both example embodiments are pumpable. Additionally, the data in Table 3 shows that while moving, each of the fluids have viscosities similar to the control fluid. Importantly, the day 7 and day 18 data shows that the viscosities remain similar even after different periods of time. These combined results indicate that the addition of either surfactant and the D-Air 3000 L defoamer, did not increase the viscosity of the liquid additive during the testing period and the example embodiments would be suitable for wellbore operations that use the control fluid as a liquid additive.

FYSA Decay Testing

The decay of the fluid is an approximate measure of the yield stress reading of the fluid. During decay testing, a test fluid is placed in a Fann viscometer fitted with a FYSA attachment and then the outer sleeve is ramped to a given rotational speed and then stopped. Because the fluid is no longer being agitated by the sleeve but is still in contact with the bob, the dial measurement during this time or "decay" is representative of the body or elasticity of the fluid. Fluids with low viscosities, such as water, are expected to have decay values close to zero, however high viscosity fluids such as a viscosifier will have a positive decay value.

The decay of the test solutions of Example 1, Example 2, and the Control were each measured using the FYSA three times over the same 18-day testing period as the FYSA ramp testing described above. Immediately following the ramp testing, the sleeve was set to rotate at 6 rpm, allowed to stabilize, and then the sleeve was stopped by turning off the gears. After approximately 10 seconds, the dial measurement was recorded as the 6 rpm decay value, or "6D." The test was repeated with the sleeve rotating at 3 rpm and the values were recorded as "3D." The dial measurements recorded during the decay testing of Example 1, Example 2, and the Control fluid are shown in Table 4 below.

TABLE 4

FYSA Dial measurements for Decay Testing

|  | Control | | Example 1- SEM 8 | | Example 2- Zone Sealant 2000 | |
| --- | --- | --- | --- | --- | --- | --- |
|  | 6 D | 3 D | 6 D | 3 D | 6 D | 3 D |
| Day 0 | 0 | 0 | 0 | 0 | 0 | 0 |
| Day 7 | 0.5 | 0.5 | 0 | 0.5 | 0.5 | 0.5 |
| Day 18 | 1 | 0.5 | 1 | 1 | 1 | 1 |

The similarities in the dial measurements presented in Table 4 shows that each of the fluids have similar viscosities during decay, which indicates that the fluids exhibit a similar yield stress. As with the ramp testing data above, the day 7 and day 18 data show that the viscosities, and therefore yield stress, of all three fluids remain similar even after extended periods. The decay testing results indicate that there was no negative effect from the D-Air 3000 L defoamer, or the SEM 8 or Zone Sealant 2000 surfactants; and a liquid additive made with either of these surfactants would be suitable for wellbore operations.

Chandler 5550 Testing

The Chandler 5550 Viscometer (Chandler 5550) is a concentric cylinder viscometer that uses a rotor and bob geometry. Although both the Fann and Chandler viscometers link the viscous drag of the test fluid to torque on the bob, the Chandler 5550 is enclosed, allowing for viscosity measurement of fluids at high pressure and high temperature without evaporation. Additionally, the Chandler 5500 allows automatic data acquisition enabling more bob deflection (dial) measurements. Throughout Chandler 5550 testing, the bob deflection is measured and used to calculate the test fluid's viscosity. The collected data also reflects if the fluid is moving (i.e. there is bob deflection) or sitting static (i.e. there is no bob deflection).

A vein spindle attachment can be used with the Chandler 5550 to calculate the viscosity of the test fluid at its yield stress breaking point. The viscosity of a fluid at its yield stress breaking point is significant for suspensions because it is reflective of the amount of energy required to re-suspend particles that have fallen out of solution. Without being bound to theory, it is believed that the viscosity of a gelled test fluid at its yield stress breaking point can be calculated using a Chandler 5550 by allowing a test fluid to sit in situ for a sufficient period of time to build yield stress. Because the spindle is not initially engaged, the yield stress of the fluid is undisturbed by the Chandler 5550. After the allotted time period, the vein spindle attachment rotates down and agitates the fluid to break the gel. The spindle deflection from the yield stress of the gelled fluid is measured by the spindle directly and used to calculate a viscosity of the fluid at the fluid's yield stress breaking point. Because the Chandler 5550 relates viscosity to bob displacement, a lower measured viscosity indicates less force and/or energy was required to reflow the fluid once gelled; however because the fluid is allowed to sit idle, the calculated viscosity is likely not representative of the fluid's viscosity while in motion.

Chandler 5550 testing of the test solutions of Example 1, Example 2, and the Control were performed three times over an 18-day testing period. Approximately 200 mL of each solution was poured into the Chandler 5550 and ramped "up" from 3 rpm to 300 rpm and then "down" from 300 rpm to 3 rpm as described above in reference to the FYSA ramp testing. Next, the test fluid was stirred for two minutes at 100 rpm and then allowed to sit static at 0 rpm for 30 minutes. Finally, the test fluid was stirred at 3 rpm for a minute and at 100 rpm for 2 minutes.

Figure 4:
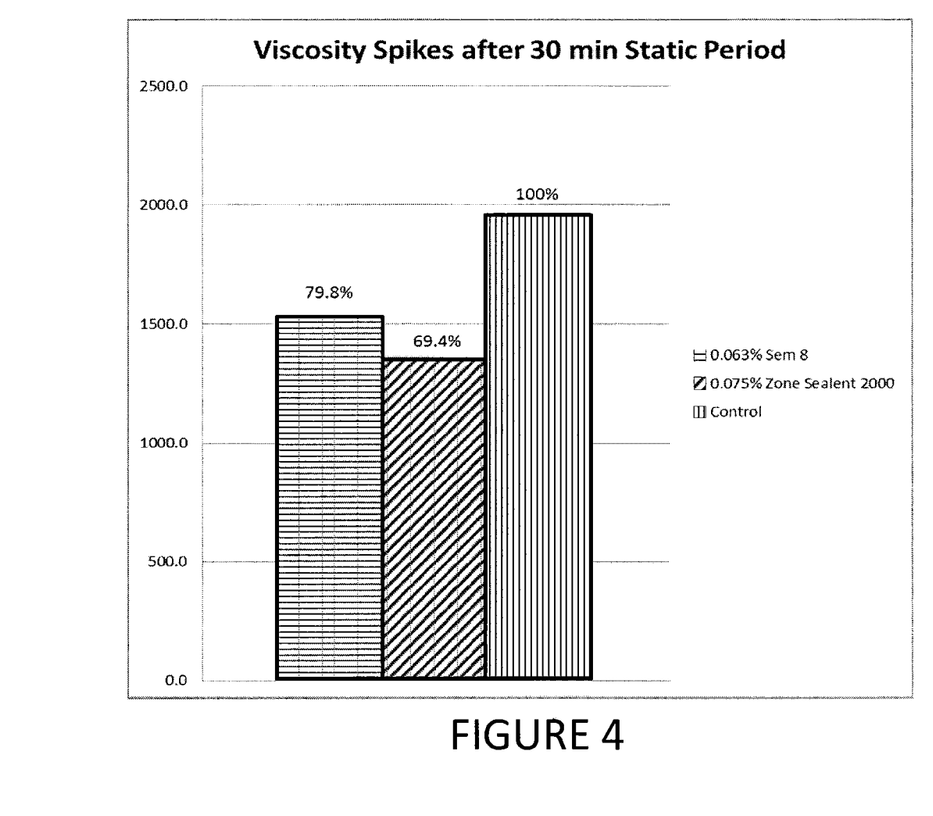
FIG. 4 illustrates viscosity spike measurements recorded during the testing of two exemplary embodiments of a liquid additive.

FIG. 4 illustrates the viscosity measurement spikes of test solutions of Example 1 and Example 2 after sitting static for 30 minutes compared to the Control solution after sitting static for the same period of time. Note that in FIG. 4, Example 1 is labeled "0.063% Sem 8" and Example 2 is labeled "0.075% Zone Sealant 2000." As shown in FIG. 4, the test solution of Example 1, namely 0.063% Sem 8, had 79.8% of the viscosity spikes and the test solution of Example 2, namely 0.075% Zone Sealant 2000, had 69.4% of the viscosity spikes compared to the Control. Moreover, the addition of the surfactants appears to reduce the viscosity of the test solution of Example 1 to slightly above 1500 cP, and the test solution of Example 2 to slightly below 1500 cP. This reduction in measured viscosity may indicate that the liquid additives containing surfactant may be pumpable even when gelled while the Control is not.

The lower measured viscosity suggests that once gelled, the test solutions of Example 1—0.063% Sem 8 and Example 2—0.075% Zone Sealant 2000 have a lower yield stress and may break up and/or reflow more easily, than the Control solution. Without being bound by theory, it is believed that the test solutions of Examples 1 and 2 are easier to break up because there is less friction between the beads in solution due the presence of the surfactant. Additionally, the viscosities in FIG. 4 are measured at the initial mixing peak, where the friction between the lightweight beads will be the greatest. Whether a fluid has a pumpable viscosity (below 1500 cP) at this stage is significant because it may prevent the need for manual mixing and/or other manual intervention. Additionally, any friction reduction at the initial mixing stage tends to correlate to a lower energy requirement to mix and recirculate the liquid additive, a cementitious slurry containing the liquid additive, and/or a wellbore fluid containing the liquid additive.

Roto-Tester Testing

As described above, after beads have fallen out of solution, they generally settle or pack into large masses. Roto-tester testing is a method used for pack set analysis—a comparison of the relative packing of beads in solution and/or how tightly or efficiently the beads are packed. Roto-tester testing utilizes a roto-tester, a container, and a level sensor that can trigger the roto-tester to stop rotation. A fluid containing beads suspended in liquid solution is placed in a container (e.g., an Erlenmeyer flask) and left undisturbed for a specific period or settling time. Although the settling time can vary, the solution is usually left undisturbed until at least a portion of the beads float out of solution forming a "crust" layer consisting mostly of packed beads. After the settling time has expired, the container is placed horizontally on a roto-tester and rotated at a specific speed. The testing apparatus is normally equipped with a light sensor that triggers the roto-tester to stop rotating once the light is blocked by a fluid and/or a solid. Initially, the packed beads will prevent the liquid from flowing beyond the crust, however, as the beads are re-suspended in the liquid, the crust will eventually be destroyed allowing the fluid to flow freely within the container and move to block the light sensor. Generally, when the same volume of the same material is tested in this manner, results only vary between 1% and 3% of the total number of turns. If the volume of fluid, type and volume of beads, container, settling time, level sensor height, and roto-tester rotation speed of two liquids are the same, a greater number of rotations can indicate that more energy was required to re-suspend the beads.

The test solutions of Example 1, Example 2, and the Control were each tested using a Slimatic Manual Packset Roto-tester which is commercially available from Intechlab Inc. Three 250 mL Erlenmeyer flasks were each filled with 160 grams of one of the three solutions. The flasks were covered with parafilm and allowed to settle for 24 hours. After the settling period had expired, each flask was set on a set on a Slimatic Manual Packset Vibrating Table which is commercially available from Intechlab Inc. The table was set at 50.07 volts and allowed to vibrate for 30 seconds. The flask was then placed on the roto-tester in a horizontal position parallel with the table top and the testing was started. Each solution was allowed to rotate until the test fluid traveled 32 mm to block the light sensor and stop the testing. The results of the rote-tester testing are provided in Table 6 below.

TABLE 6

Roto-Tester Test Results

| Material | Number of Turns |
| --- | --- |
| Control | 193 |
| Example 1 - SEM-8 | 136 |
| Example 2 - Zone Sealant 2000 | 134 |

As discussed above, roto-tester results typically vary by less than 3% when the same volume of the same material is tested. As indicated in Table 6, the test solutions of Example 1 and Example 2 showed a reduction (approximately 30%) in the number of turns compared to the Control solution. These results indicate that the addition of either surfactant, SEM-8 or Zone Sealant 2000, decreased the amount of energy required to reflow the liquid additive once gelled.

Visual Inspection

As a final qualitative test, 100 mL of each of the test solutions of Example 1, Example 2, and the Control were poured into one of three sealed containers and left undisturbed. After approximately two hours, visual inspection of the containers revealed that each test solution had a small amount of free fluid visible at the bottom of its container. When measured, the test solution of Example 1 had 5 mL of visible liquid at the bottom of its container, the test solution of Example 2 had 4 mL of visible liquid at the bottom of its container, and the test solution of the Control had 2 mL of visible liquid at the bottom of its container. After the visible liquid was quantified, re-suspension of the beads was attempted using manual manipulation with the aid of a spatula. The beads observed to be packed off from the Control fluid were the most difficult to re-suspend while the beads packed off from the Zone Sealant 2000 fluid were significantly easier. The visual inspection data and manual manipulation observations both tend to suggest that the yield stress approximations obtained with the Fann and Chandler 5550 viscometers as well as the reduced number of turns observed in the roto-tester testing was due to a reduction in the energy required to re-suspend the beads and not due to a reduction in the number of beads that had fallen out of solution. These combined results suggest that the exemplary embodiments would require less energy to re-suspend beads that have floated out of solution and may prevent the need for manual manipulation during manufacturing processing.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. While the present invention has been described in terms of certain examples and embodiments, those of ordinary skill in the art will recognize that the invention can be practiced with modification within the spirit and scope of the appended claims. Accordingly, it is appropriate that the appended claims be construed broadly and in a manner consistent with the scope of the invention.

As used herein, the term "about" indicates a range which includes ±5% when used to describe a single number. When applied to a range, the term "about" indicates that the range includes −5% of a numerical lower boundary and +5% of an upper numerical boundary. For example, a range of from about 100° C. to about 200° C., includes a range from 95° C. to 210° C. However, when the term "about" modifies a percentage, then the term means±1% of the number or numerical boundaries, unless the lower boundary is 0%. Thus, a range of 5-10%, includes 4-11%, while a range of 0-5%, includes 0-6%.

What is claimed is:

1. A method of suspending lightweight beads, comprising combining lightweight beads with a fluid to form a liquid additive;
   wherein the fluid comprises a surfactant selected from: alcohol ether sulfates, betaines, sulfo-betaines, amine-oxides, polyether carboxylates, alkanolamides, sorbitan, and sorbitol derivatives; and
   wherein at least a portion of the lightweight beads are suspended in the fluid.

2. The method of claim 1, wherein:
   (i) the lightweight beads contain one or more members selected from glass beads and cenospheres;
   or
   (ii) the liquid additive is introduced into a wellbore using one or more pumps.

3. The method of claim 1, further comprising:
   (i) combining the liquid additive with a water absorbing material;
   (ii) combining the liquid additive with additional fluid to form a diluted liquid additive, and
   (iii) forming a cement composition by combining the diluted liquid additive with a cementitious material; or
   (iv) mixing the components of the liquid additive using mixing equipment.

4. The method of claim 1, further comprising:
forming a cement composition by combining the liquid additive with a cementitious material.

5. The method of claim 1, further comprising:
combining the liquid additive with a wellbore fluid to reduce the density of the wellbore fluid to about 20% to about 40% of the density of the wellbore fluid without the liquid additive.

6. The method of claim 5, further comprising:
forming a cement composition by combining the wellbore fluid with a cementitious material.

7. A lightweight cement composition, comprising:
a cementitious material;
a water absorbing material; and
a liquid additive, the liquid additive comprising:
  a fluid;
  a surfactant selected from: alcohol ether sulfates, betaines, sulfo-betaines, amine-oxides, polyether carboxylates, alkanolamides, sorbitan, and sorbitol derivatives;
  an antifoaming agent, and
  lightweight beads;
wherein the lightweight cement composition has a density from about 4 pounds per gallon to about 16 pounds per gallon.

8. The lightweight cement composition of claim 7,
wherein the lightweight beads are present in an amount sufficient to reduce the density of the lightweight cement composition to about 20% to about 40% of the density of the lightweight cement composition without the lightweight beads; and
wherein at least a portion of the lightweight beads are suspended in the fluid.

9. The lightweight cement composition of claim 7, wherein:
  (i) one or more of the components of the lightweight cement composition are mixed using mixing equipment;
  (ii) the lightweight cement composition is introduced into a wellbore using one or more pumps;
  (iii) the cementitious material is selected from Portland cements, gypsum cements, high alumina content cements, slag cements, high magnesia content cements, shale cements, acid/base cements, fly ash cements, zeolite cement systems, kiln dust cement systems, microtine cements, metakaolin, resins, epoxies, and combinations thereof;
  (iv) the liquid additive is present in a volume selected from about 1% to about 50% by volume of total fluid, from about 5% to about 30% by volume of total fluid, and from about 5% to about 20% by volume of total fluid; or
  (v) the water absorbing material is present in a volume selected from about 0.1% to about 10% by volume of lightweight beads, from about 0.1% to about 3% by volume of lightweight beads, and from about 0.2% to about 2% by volume of lightweight beads.

10. The lightweight cement composition of claim 7, wherein the fluid comprises an aqueous fluid selected from fresh water, brackish water, saltwater, brine, aqueous drilling fluids, and any combination thereof.

11. The lightweight cement composition of claim 10, further comprising water in an amount selected from about 20% to about 80% by volume of liquid additive, from about 30% to about 70% by volume of liquid additive, and from about 35% to about 50% by volume of liquid additive.

12. The lightweight cement composition of claim 7, further comprising:
  (i) the surfactant in an amount selected from about 0.001% to about 10% by volume of liquid additive, from about 0.005% to about 4% by volume of liquid additive, and from about 0.01% to about 2% by volume of liquid additive; or
  (ii) the antifoaming agent in an amount selected from about 0.001% to about 10% by volume of liquid additive, from about 0.005% to about 4% by volume of liquid additive, and from about 0.01% to about 2% by volume of liquid additive.

13. A liquid additive comprising:
a fluid;
a surfactant selected from: alcohol ether sulfates, betaines, sulfo-betaines, amine-oxides, polyether carboxylates, alkanolamides, sorbitan, and sorbitol derivatives; and
lightweight beads;
wherein at least a portion of the lightweight beads are suspended in the fluid.

14. The liquid additive of claim 13, wherein:
  (i) the liquid additive may be combined with a cementitious material to form a lightweight cement composition;
  (ii) the lightweight beads are present in an amount selected from about 0.2% to about 80% by volume of liquid additive, from about 30% to about 70% by volume of liquid additive, and from about 45% to about 65% by volume of liquid additive;
  (iii) the components of the liquid additive are mixed using mixing equipment; or
  (iv) the liquid additive is introduced into a wellbore using one or more pumps.

15. The liquid additive of claim 13, further comprising one or more additives selected from: an anti-foaming agent and a water absorbing material.

16. The liquid additive of claim 14, wherein the liquid additive is combined with a cementitious material and water to form a lightweight cement composition, the cementitious material being selected from Portland cements, gypsum cements, high alumina content cements, slag cements, high magnesia content cements, shale cements, acid/base cements, fly ash cements, zeolite cement systems, kiln dust cement systems, microfine cements, metakaolin, resins, epoxies, and combinations thereof.

17. A wellbore fluid, comprising:
an aqueous fluid; and
the liquid additive of claim 8.

18. The wellbore fluid of claim 17, wherein:
  (i) the lightweight beads are added in an amount sufficient to reduce the density of the wellbore fluid;
  (ii) the lightweight beads reduce the density of the wellbore fluid by at least 10%;
  (iii) the lightweight beads are selected to reduce the density of the wellbore fluid relative to a second wellbore fluid;
  (iv) the wellbore fluid combines with a cementitious material to form a lightweight cement slurry having a density in the range of from about 4 pounds per gallon to about 16 pounds per gallon;
  (v) the aqueous fluid is selected from fresh water, brackish water, saltwater, brine, aqueous drilling fluids, and any combination thereof;
  (vi) the components of the wellbore fluid are mixed using mixing equipment;
  (vii) the wellbore fluid is introduced into a wellbore using one or more pumps;

(viii) the components of the liquid additive are mixed using mixing equipment; or
(ix) the liquid additive is introduced into a wellbore using one or more pumps.

19. The wellbore fluid of claim 18, wherein the lightweight beads are added in an amount to reduce the density of the wellbore fluid and the wellbore fluid is a spacer fluid.

20. The method of claim 3:
(i) further comprising mixing the components of the cement composition using mixing equipment; or
(ii) wherein the cement composition is introduced into a wellbore using one or more pumps.

* * * * *

UNITED STATES PATENT AND TRADEMARK OFFICE
CERTIFICATE OF CORRECTION

PATENT NO. : 10,723,934 B2  
APPLICATION NO. : 16/060975  
DATED : July 28, 2020  
INVENTOR(S) : Simone E. A. Lumsden, Sam J. Lewis and Greg R. Hundt Page 1 of 1

It is certified that error appears in the above-identified patent and that said Letters Patent is hereby corrected as shown below:

In the Specification

Column 8, Line 13, change "microtine" to -- microfine --

In the Claims

Column 19, Line 47, change "microtine" to -- microfine --

Signed and Sealed this
Twenty-seventh Day of October, 2020

Andrei Iancu
*Director of the United States Patent and Trademark Office*